United States Patent [19]

Condon

[11] 4,308,729
[45] Jan. 5, 1982

[54] UNIVERSAL JOINT SLIP SPLINE CONNECTION HAVING CONCENTRIC ONE-WAY VALVES

[75] Inventor: William T. Condon, Rockford, Ill.

[73] Assignee: Twin Disc, Incorporated, Racine, Wis.

[21] Appl. No.: 136,704

[22] Filed: Apr. 2, 1980

[51] Int. Cl.³ .............................................. F16D 3/06
[52] U.S. Cl. ....................................... 64/23; 64/17 A
[58] Field of Search ..................... 64/17 A, 17 SP, 23, 64/23.5, 23.6, 23.7; 403/11, 359

[56] References Cited

U.S. PATENT DOCUMENTS 3,073,134 1/1963 Mann ........................................ 64/23
4,113,060 9/1978 Smith .............................. 64/17 A X

FOREIGN PATENT DOCUMENTS 918007 8/1954 Fed. Rep. of Germany .......... 64/23

Primary Examiner—Tony M. Argenbright
Attorney, Agent, or Firm—James E. Nilles

[57] ABSTRACT

A slip spline connection including a pair of concentric telescoping members for connecting two universal joints for rotation together. The members and their joints move axially toward and away from one another in operation, and define a chamber therebetween which is subjected to a pumping action as the internal volume of the chamber increases or decreases. A lubricant, such as oil is provided in the chamber for lubricating the slideable spline connection between the telescoping members. Two concentric one-way valves are provided as a single unit, with a provision for air filtration, and is located along the axis of rotation where it is not influenced by centrifugal force. As the slip spline connection is compressed, air is expelled through one of the valves, and as the slip spline connection is extended, the other valve acts to permit air to enter the chamber.

12 Claims, 6 Drawing Figures

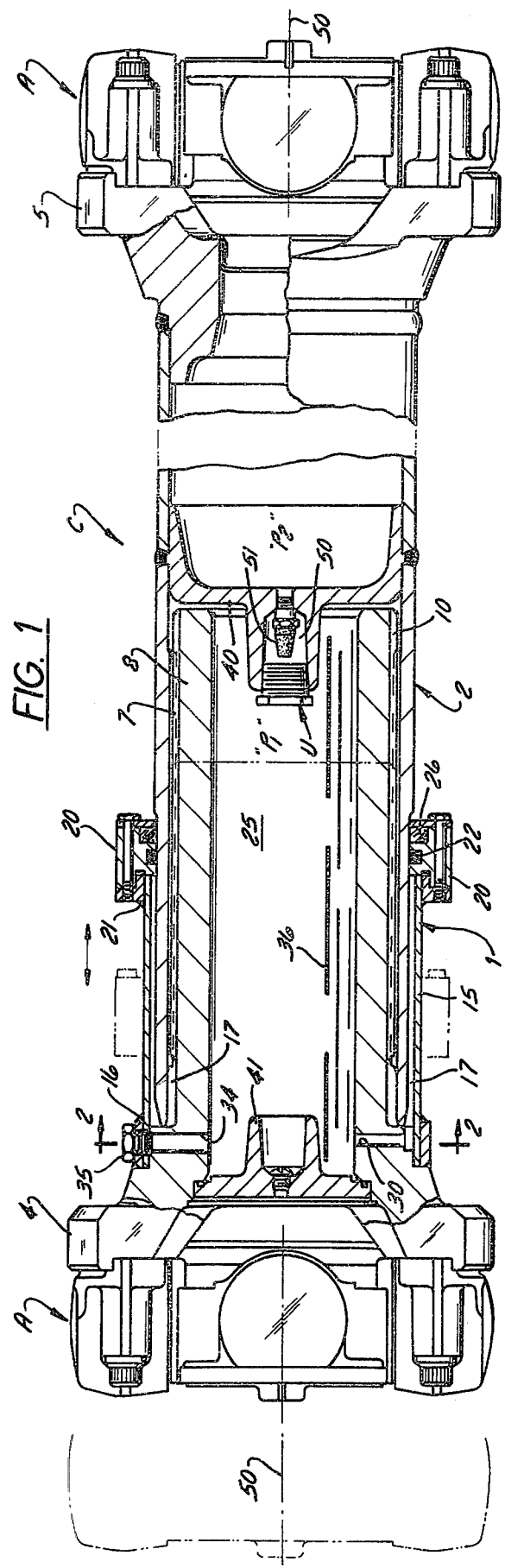
FIG. 1
FIG. 2
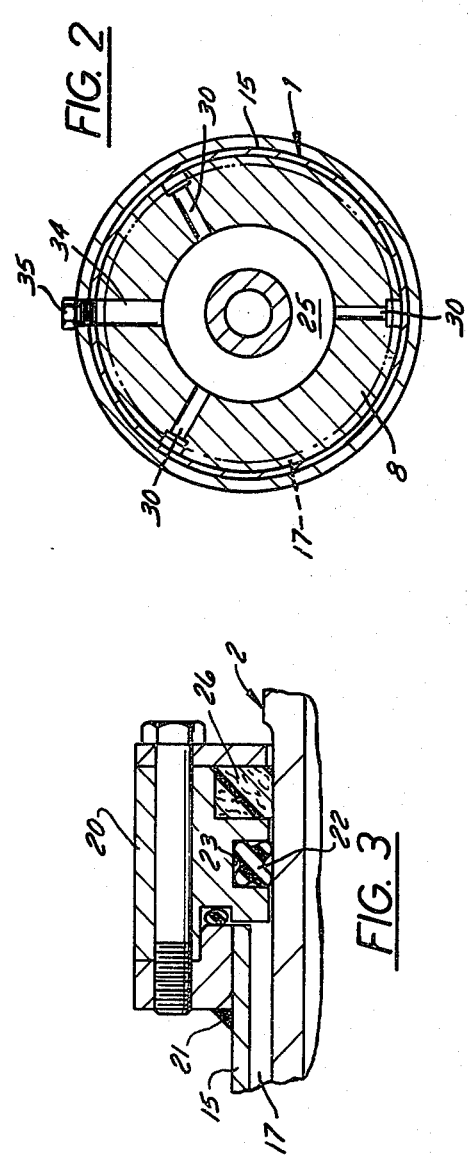
FIG. 3

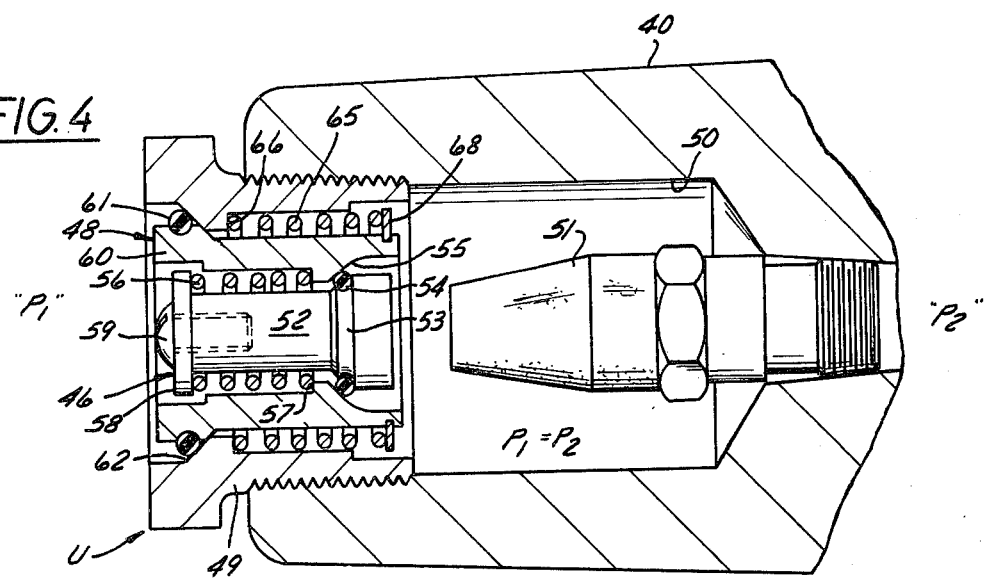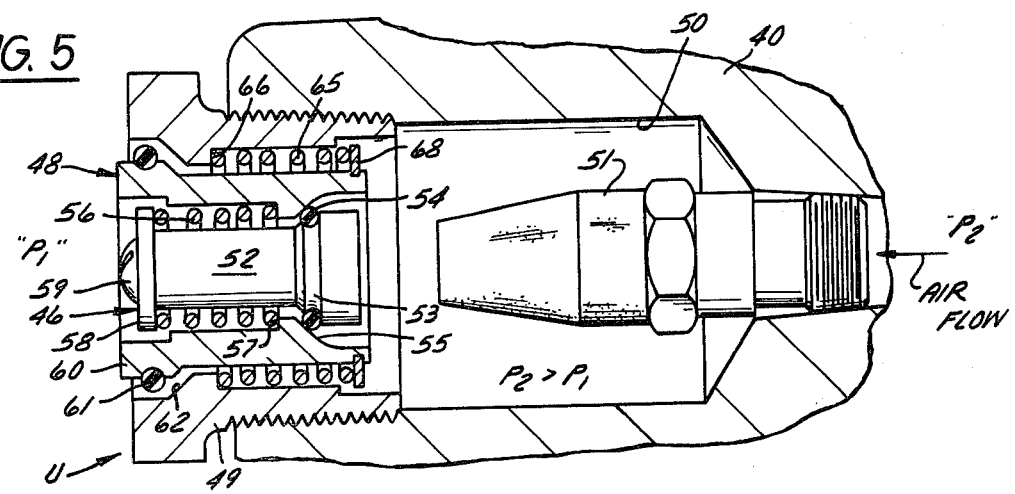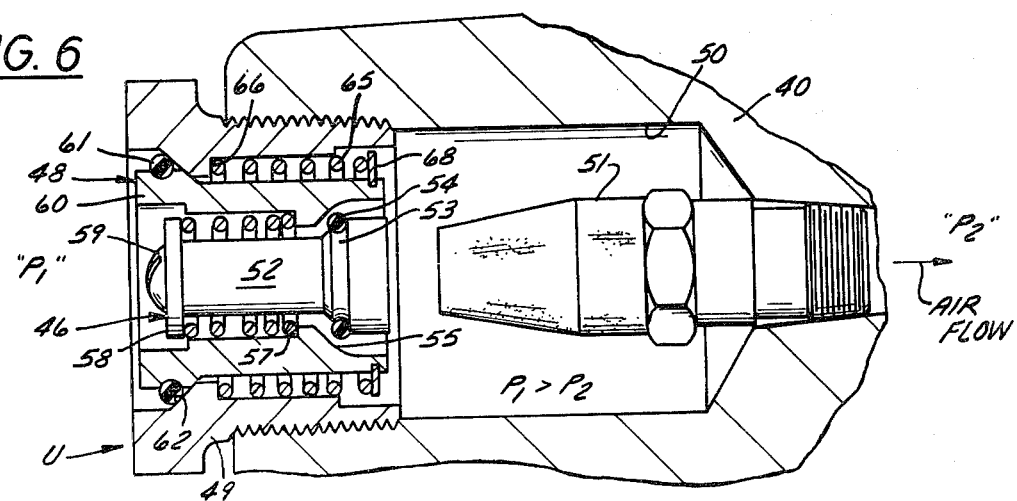

UNIVERSAL JOINT SLIP SPLINE CONNECTION HAVING CONCENTRIC ONE-WAY VALVES

BACKGROUND OF THE INVENTION

Universal joint slip spline connections permit movement of the universal joints toward and away from one another during operation and generally create a pumping action in the chamber formed between the telescoping members of the connection. As the telescoping members are contracted during a compression stroke of the connection, positive pressure is generated in the chamber, and as the telescoping members are extended, a negative pressure or vacuum is formed in the chamber.

If the slip spline chamber is sealed to accommodate high pressure, the spline cannot be easily moved and reaction forces in the supporting end machinery become larger. To minimize these forces, among others, a felt or lip type rubber seal is used, which leaks at relatively low positive pressure. The reverse action of a conventional lubrication fitting one-way valve allows the chamber to open to atmosphere when the extension stroke produces a vacuum. If the slip spline chamber is filled with lubricant, the pump action will purge lubricant out through the low pressure seal, and will permit intake of air into the chamber through the one-way lubricant valve fitting. At some point, the pressure required to compress the air volume within the chamber to compensate for internal volume change in the chamber will equal the seal leak pressure, and lubricant leakage through the seal will cease. This equilibrium condition occurs only if rotational speed is low and slip spline movement is slow, and then both felt and lip type seals perform quite satisfactorily. However, many universal joint applications require rapid spline movement at high operating speeds, and prior art slip spline designs which are subjected to high speed and rapid slip have two major deficiencies:

(1) The static seal leak pressure, which is set at a low level to minimize forces requires to move the spline, is further diminished by the effect of centrifugal force which lifts the seal lip away from the female spline member. This reduction in seal leak pressure in turn causes two problems:
  (a) The equilibrium established between seal leak pressure and internal air pressure is now altered and the slip spline pumping action purges lubricant through the seal until a new pressure balance is attained.
  (b) Rotation of the slip spline chamber produces pressure in the annulus volume of lubricant which exceeds the seal leak pressure and lubricant leaks through the seal.

(2) Rapid movement of the slip spline tends to produce high lubricant flow through the small clearances in the slip spline teeth which in turn causes high pressure in the lubricant adjacent to the seal. Since the seal leak pressure is relatively low, the lubricant does not transfer, instead it purges out the seal. The centrifugal effect forces lubricant slowly through the spline to fill the void adjacent to the seal, and the cycle repeats itself until no further lubricant remains in the chamber.

SUMMARY OF THE INVENTION

The present invention provides a universal joint slip spline connection having a pair of concentric telescoping members which in turn have a sliding spline connection between them, and which members define a pumping chamber. Two concentrically arranged one-way valves which act in opposite directions to one another, are located in the connection and generally on the axis of rotation. One of the valves acts to permit entry of air into the chamber when the joint is being extended and the other valve acts to permit air to exit from the chamber when the connection is being compressed, thus eliminating resistance to relative axial movement of the members and at the same time preventing leakage of lubricant from the interior of the connection. By locating the concentric valves generally on the axis of rotation, they are not influenced by centrifugal pressure and furthermore, the lubricant in the chamber forms as an annulus at the outer portion of the chamber due to centrifugal force and therefore the lubricant does not pass through the air exit valve. The operating pressure at both valves then reset at very low values for example 2 to 4 p.s.i., whereby the forces required to slip the spline connection are much lower than conventional slip splines. The two concentric valves are formed as a single unit and can be preassembled as a unit and can be located at either end of the chamber. This permits the slip joint connection to be used in a vertical position wherein the concentric valves are located at the upper end of the connection and out of the pool of lubricant in the chamber.

A further aspect of the invention relates to a filter for the air to prevent contamination of the spline chamber, the filter being located between the exterior of the connection and the concentric valves and in this manner, a single filter element can be used for both valves and is protected within the confines of the connection.

The present invention provides a universal joint slip spline connection having a pair of concentric, oppositely acting air valves that are always in communication with the air and not submerged in the lubricant and furthermore the connection provided has virtually no lubricant leakage under any operating conditions.

These and other objects and advantages of the present invention will appear hereinafter as this disclosure progresses reference being had to the accompanying drawings.

BRIEF DESCRIPTION OF THE DRAWINGS

FIG. 1 is a longitudinal, cross-sectional view through a universal joint slip spline connection embodying the present invention;

FIG. 2 is a transverse, cross-sectional view taken generally along the line 2—2 in FIG. 1;

FIG. 3 is an enlarged, fragmentary view of the flexible seal and wiper assembly between the telescoping members shown in FIG. 1;

FIG. 4 is an enlarged, cross sectional view of the pair of concentrically arranged one-way valves shown in elevation in FIG. 1, the view furthermore showing the position of the valves when the joint connection is in the neutral position, that is when the pressure inside the chamber is equal to the exterior pressure;

FIG. 5 is a view similar to FIG. 4, but showing the position of the outer valve when opened so as to permit air flow into the chamber as when the joint is being extended; and FIG. 6 is a view similar to FIG. 5, but showing the inner, air exit valve in the open position to permit air to exit from the interior chamber as when the spline joint is being contracted or compressed.

DESCRIPTION OF A PREFERRED EMBODIMENT

The universal joint slip spline connection C as shown in FIG. 1 is comprised of a pair of concentric telescoping members 1 and 2 at the remote or opposite ends of which is fixed yokes 4 and 5, respectively. The yokes 4 and 5 form a part of a universal joint including a cross and bearing assembly A and a further description of these joints is deemed to be neither necessary nor desirable, except to say that in operation the distance between the joints increases or decreases or decreases as the connection C is extended or retracted in the known manner.

Telescoping member 1 has a set of external splines 7 around its tubular inner sleeve 8 and telescoping member 2 has a series of axial splines 10 around its interior and which are slideably engaged with splines 7 for rotational driving connection therewith. Telescoping member 1 also includes an outer sleeve 15 which is welded at one end 16 to the inner sleeve 8 to form an annular space 17. Telescoping member 2 slides axially in space 17 between the inner tubular sleeve 8 and the outer sleeve 15 of member 1.

The sleeve 15 has an o-ring carrier 20 secured thereto as by welding at 21 and a Quad ring or o-ring 22 is located in the annular groove 23 which is formed on the internal surface of the o-ring carrier 20. Thus, the ring 22 acts to seal between the telescoping members and prevents the oil which is located in the spline connection and in the interior chamber 25 from leaking out between the telescoping members.

A felt wiper 26 is also provided between the telescoping members which protects the main seal 22. This type of seal is capable of sealing against high pressure and is essentially unaffected by centrifugal forces and consequently effectively seals the pressure generated in the lubricant due to centrifugal force and also the pressure generated from the "pumping action" of the connection and lubrication fluid flow.

It should be noted that several radially extending passages 30 are drilled in the telescoping member 8 and permit free passage of lubricating fluid from the inner chamber 25 of sleeve 8 to the annular space 17 to thereby permit lubricating fluid to have ready access to the spline connection between the telescoping member, thereby permitting rapid and easy relative axial movement of the spline connection members.

A fill passage 34 is closed by a plug 35 so that the lubricant such as oil can be poured in or removed from the chamber 25. When in operation, lubricating fluid is thrown outwardly due to centrifugal force forming an annulus at its inner surface 36 at the location shown for example and of course this will vary depending on the amount of fluid used.

An interior, transverse wall 40 is secured as by welding across the interior of the telescoping member 2. Wall 41 is located transversely across the interior of the telescoping member 8, thereby defining the chamber 25 within the slip spline connection.

In accordance with the present invention, two concentrically arranged, one-way valves 46 and 48 are provided along the axis 50 of the connection, that is along the rotational axis of the slip spline connection, both valves being formed as a unit U having an outer threaded collar 49 which is threadably engaged in the transverse wall 40. In the counterbore 50 formed in the transverse wall is located a sintered air filter 51 which is also threadably engaged in the wall 40 and the filter serves to filter all air passing between the inner chamber 25 and the exterior of the connection C.

Both of the concentric valves 46 and 48 are of the low pressure type and are set to crack at, for example 2 to 4 p.s.i. Valve 46 includes a shiftable element 52 having a valve seat 53 on which is located a seal ring 54. Seal ring 54 abuts in sealing relationship with the tapered seat 55 formed in the shiftable valve element 60 of valve 48. A spring 56 acts between a shoulder 57 on valve element 60 and is held captive around the element 52 by a washer 58 fixed by screw 59 on the end of the valve element 52. Thus, the spring 56 biases the valve element 52 to the left as viewed in FIG. 4, that is to the closed position. As shown in FIG. 4, the valve 52 is closed while in FIG. 6, it is shown in the open position. The valve has been opened in the FIG. 6 showing when the pressure P1 in the chamber 25 exceeds the external pressure P2 thereby permitting air to flow out of the chamber.

The valve 48 has a seal 61 around its periphery which abuts against the tapered surface 62 of the collar 49 and is resiliently held in the sealed position by a spring 65 that acts between the shoulder 66 of the collar 49 and the snap ring 68 around the end of the shiftable valve element 60. As shown in FIG. 5, the valve 48 has been cracked to the open position to permit entry of air into the chamber when the external pressure P2 exceeds that of the pressure P1 in the chamber as for example when the slip spline connection is being extended.

Thus, the two valves act to check air flow in opposite directions and the valve unit U is located out of the lubricant in the chamber when the connection is rotating.

It will be appreciated that the valve unit U can be installed in the connection at either end of the chamber, thereby permitting the valve unit to be located at the upper end of the chamber when the connection is used in the vertical position.

I claim:

1. A universal joint slip spline connection including a pair of concentric telescoping members which relatively extend and contract and define a pumping chamber therebetween, a dual valve unit located between said pumping chamber and the exterior of said connection, said unit including two concentrically arranged, one-way air valves which act to check the flow of air in opposite directions to thereby permit flow of air into the chamber when said connection is being extended and permit the flow of air out of the chamber with the connection is being compressed, said concentrically arranged valves being located on the rotational axis of said connection.

2. The connection set forth in claim 1 further characterized in that said unit includes a threaded collar, one of said members having an interior wall thereacross and said collar is threadably engaged in said wall, and said valves are concentrically located with respect to one another and within said collar.

3. The connection set forth in claim 2 including an air filter located between said valve unit and the exterior of said connection.

4. The connection set forth in claim 2 further characterized in that said one-way valves each include a seal member mounted thereon and adapted to abut against a valve seat, and spring means for resiliently urging said valves to a closed position.

5. The connection set forth in claim 1 further characterized in that one of said telescoping members comprises a tubular sleeve having an external splined portion, and a second sleeve surrounding and concentric with said tubular sleeve and secured at one end therewith and defining an annular space therewith which is open at the opposite end; and said other telescoping member comprises a splined sleeve which is adapted to be slidingly received in said annular space and in telescoping relationship therewith, and a ring seal carried by said second sleeve for sliding and sealing abutment with said other telescoping member.

6. A universal joint slip spline connection including a pair of concentric telescoping members which relatively extend and contract and define a pumping chamber therebetween; one of said telescoping members comprising a tubular sleeve having an external splined portion, and a second sleeve surrounding and concentric with said tubular sleeve and secured at one end therewith and defining an annular space therewith which is open at the opposite end; and said other telescoping member comprises a splined sleeve which is adapted to be slidingly received in said annular space and in telescoping relationship therewith, and a ring seal carried by said second sleeve for sliding and sealing abutment with said other telescoping member; one of said members having a transverse interior wall thereacross, a dual valve unit including a threaded collar threadably engaged in said wall and located between said pumping chamber and the exterior of said connection, said unit including two concentrically arranged, one-way air valves located in said collar and which act to check the flow of air in opposite directions to thereby permit flow of air into the chamber when said connection is being extended and permit the flow of air out of the chamber when the connection is being compressed, said concentrically arranged valves being located on the rotational axis of said connection.

7. The connection set forth in claim 6 further characterized in that said one-way valves each include a seal member mounted thereon and adapted to abut against a valve seat, and spring means for resiliently urging said valves to a closed position.

8. The connection set forth in claim 6 including an air filter located between said valve unit and the exterior of said connection.

9. A universal joint slip spline connection including a pair of concentric telescoping members which relatively extend and contract and define a pumping chamber therebetween; one of said telescoping members comprising a tubular sleeve having an external splined portion, and a second sleeve surrounding and concentric with said tubular sleeve and secured at one end therewith and defining an annular space therewith which is open at the opposite end; and said other telescoping member comprises a splined sleeve which is adapted to be slidingly received in said annular space and in telescoping relationship therewith, and a ring seal carried by said second sleeve for sliding and sealing abutment with said other telescoping member; one of said members having a transverse interior wall thereacross, a dual valve unit including a threaded collar threadably engaged in said wall and located between said pumping chamber and the exterior of said connection, said unit including two concentrically arranged, one-way air valves located in said collar and which act to check the flow of air in opposite directions to thereby permit flow of air into the chamber when said connection is being extended and permit the flow of air out of the chamber when the connection is being compressed, said one-way valves each including a seal member mounted thereon and adapted to abut against a valve seat, and spring means for resiliently urging said valves to a closed position, said unit being located on the rotational axis of said connection, and an air filter located between said valve unit and the exterior of said connection.

10. The connection set forth in claim 5 including radially extending passage means between and communicating with said annular space and the interior of said tubular sleeve to permit free flow of fluid therebetween.

11. The connection set forth in claim 6 including radially extending passage means between and communicating with said annular space and the interior of said tubular sleeve to permit free flow of fluid therebetween.

12. The connection set forth in claim 9 including radially extending passage means between and communicating with said annular space and the interior of said tubular sleeve to permit free flow of fluid therebetween.

* * * * *